United States Patent

Holiday

[15] 3,662,078
[45] May 9, 1972

[54] SELF TEACHING MACHINE
[72] Inventor: William Holiday, La Mirada, Calif.
[73] Assignee: Mattel, Inc.
[22] Filed: Sept. 11, 1969
[21] Appl. No.: 857,016

[52] U.S. Cl. ................................................35/9 A, 339/11
[51] Int. Cl. ...........................................................G09b 7/06
[58] Field of Search...................35/9, 8, 5, 6, 9 C, 9 A; 2/21; 223/101; 339/11; 317/262; 128/1.4, 303, 303.13, 407, 408, 409

[56] References Cited

UNITED STATES PATENTS

| | | | |
|---|---|---|---|
| 472,968 | 4/1892 | Bradley | 128/407 X |
| 2,311,276 | 2/1943 | Wilcox | 339/11 X |
| 2,546,666 | 3/1951 | Fleischer | 35/9 |
| 3,141,244 | 7/1964 | Smith | 35/9 |

*Primary Examiner*—Wm. H. Grieb
*Attorney*—J. Carrol Baisch

[57] ABSTRACT

A self teaching machine wherein means are provided for recording and presenting a sequence of problems one at a time to a student. A prepared answer sheet has a plurality of answers for each question with the correct answer to each of the questions being associated with conductive areas. The wrong answers are associated with non-conductive areas that appear visually identical, that is, the conductivity or non-conductivity of the associated areas is not discernable to the human eye. A student is provided with a probe means which is connected to a control means for advancing the recording and presenting means to ask another question and stopping the recording and presenting means when the question has been asked. The recording and presenting means is advanced to the next question when the student touches the probe means to a conductive area corresponding to a correct answer thereby completing a circuit in the advancing means.

7 Claims, 13 Drawing Figures

INVENTOR
WILLIAM HOLIDAY

BY Edward Dugas
ATTORNEY

INVENTOR
WILLIAM HOLIDAY

BY Edward Dugas
ATTORNEY

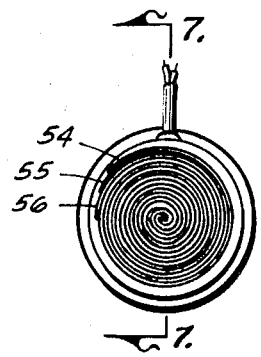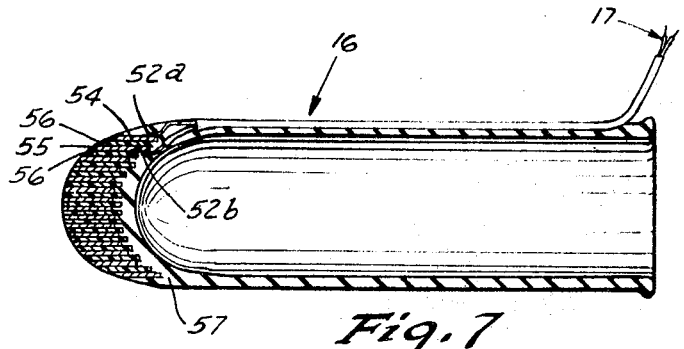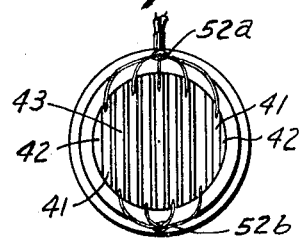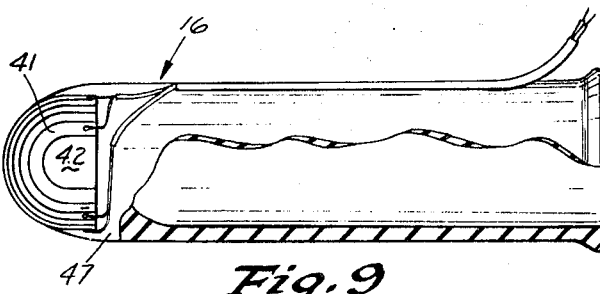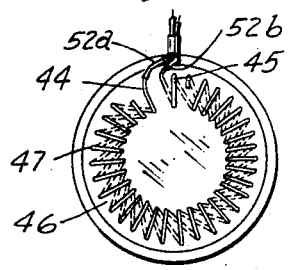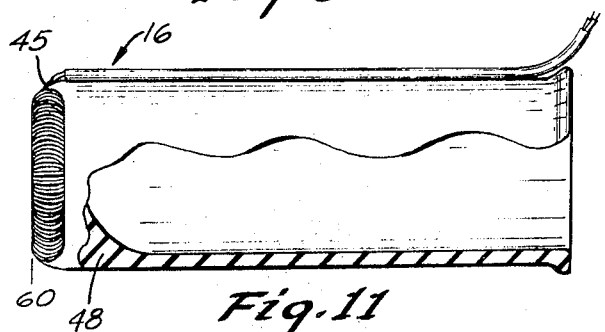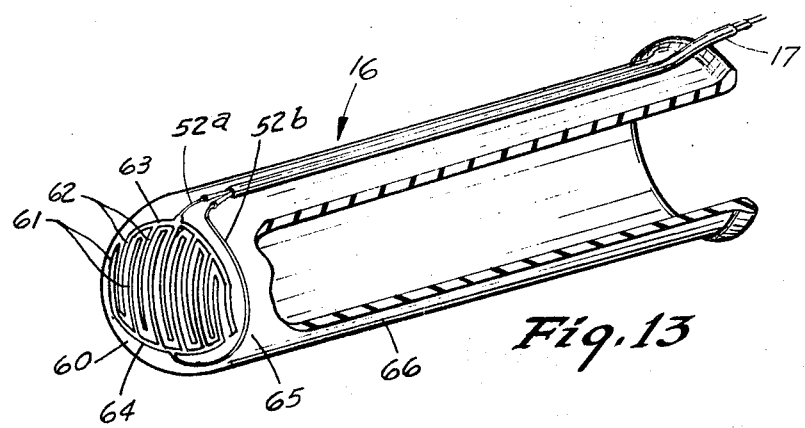

3,662,078

SELF TEACHING MACHINE

BACKGROUND OF THE INVENTION

The prior art is replete with teaching machines of a complicated mechanical and/or electrical construction. Such machines are not only expensive to construct but also are difficult to use. In many cases the answer page or read out sheet is destroyed by the mere answering of the question. It is not only expensive to set up and operate such machines, it is also difficult for children to use such machines with any degree of ease. Needless to say, the machines are far from being portable.

A prior art device of interest is disclosed in U.S. Pat. No. 2,835,052. The device of that patent operates with a roll of film having questions thereon and a transparent block in one of six positions corresponding to a correct answer after each question. Six parallel shutters separate a light source from six photo cells positioned behind the film. The player selects a key to depress and the corresponding shutter opens. If the transparent block is between the light source and the photo cell corresponding to a correct answer, then the film advances and a correct answer light comes on. If not, the incorrect answer light comes on and the film does not advance.

Applicant's device is extremely portable and uncomplicated in its mechanical and electrical makeup. The device in the reference patent is large and mechanically complex which also makes it expensive.

Another patent of interest is U.S. Pat. No. 2,953,859, entitled "Automatic Electrical Teaching Device" by A. A. Fink. In that patent, an answer board has one end of one conductor connected to a recessed opening with the opening shaped as a mathematical term. The other end of each conductor is connected to a corresponding switch which is activated through an opening in a tape which corresponds to the right answer. A probe used by the student is connected to a terminal of each switch so that a complete circuit occurs when the probe tip comes into contact with the conductor in the correctly shaped opening.

In applicant's device, only the probe is connected to the advancing means. The answer sheet or book remains unattached and may be moved to any convenient position by the student.

Another device of particular interest is disclosed in U.S. Pat. No. 3,206,871, entitled "Coded Matrix for Teaching." In that device a penetrable shield fits over a matrix of conductors which are not insulated at positions corresponding to a correct answer. An electrically conductive probe is pushed through the penetrable shield and if the position is correct, the probe will contact a conductor which will activate a circuit providing an indication of the correctly selected answer.

Again, the operator must pierce the answer sheet in the process of answering the questions. The sheet is thereby rendered useless for repeated attempts at answering the questions either by the same student or another student.

SUMMARY OF THE INVENTION

A means for recording and presenting a sequence of problems one at a time is provided for asking a question. A prepared answer sheet having a plurality of answers to each question, at least one of which is correct, has the correct answer associated with a conductive area. The wrong answers are associated with a non-conductive area, the conductivity of the areas being non-discernable visually to the student. A probe means designed to be held by the student has affixed to one end thereof an array of spaced apart conductors with each alternate conductor connected together in circuit and each other alternate conductor connected together in circuit. Advancing means connected to the conductors of each alternate and each other alternate conductor provides an advance signal to the recording and presenting means when the spaced apart conductors are electrically connected together by the conductive area associated with the correct answer. Upon receipt of the advance signal, the recording and presenting means asks the student another question, stops and waits for the next advance signal.

Accordingly, it is an object of the present invention to provide an improved self teaching device.

It is another object of the present invention to provide a teaching device which can be operated efficiently by children.

It is another object of the invention to provide a teaching device which is extremely simple in construction and operation.

It is still another object of the present invention to provide a teaching device wherein the subject matter may be changed easily.

It is a further object of the invention to provide a teaching device which does not mark or destroy the answer sheet.

These and other objects of the present invention will be better understood when taken in conjunction with the following description and drawings, throughout which like characters indicate like parts, and which drawings form a part of this application.

BRIEF DESCRIPTION OF THE DRAWINGS

FIG. 7 is a sectioned view of a probe which may be used with the embodiment of FIG. 1;

FIG. 8 is a front view of the probe of FIG. 7;

FIG. 9 is a sectioned view of a probe which may be used with the embodiment of FIG. 1;

FIG. 10 is a front view of the probe of FIG. 9;

FIG. 11 is a sectioned view of a probe which may be used with the embodiment of FIG. 1;

FIG. 12 is a front view of the probe of FIG. 11; and

FIG. 13 is a projection view, partially sectioned, of a probe which may be used with the embodiment of FIG. 1.

DESCRIPTION OF THE PREFERRED EMBODIMENTS OF THE INVENTION

Figure 1:
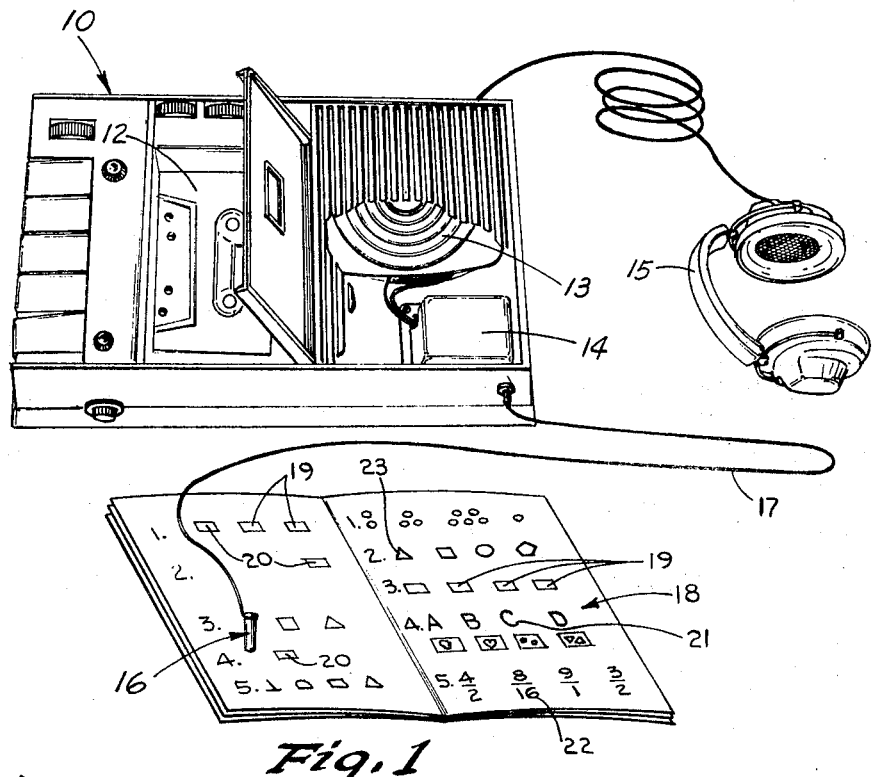
FIG. 1 is a projection view of the preferred embodiment of the invention.

Referring to FIG. 1, a tape recorder 10 adapted to hold reels of recording tape 12 which may be the cassette type reels, is used to record and present the student with a question, either through the built-in speaker 13 or through the earphones 15. The earphones can be used to advantage in group classes where each student is studying a different tape or where the students are working at different speeds. A sequence of problems are recorded on the tape. After each problem, a tone or other indexing means is applied to the tape to provide a stop signal. The explanation of the operation of this stop signal will be undertaken later in the following description. Means 14 for advancing the tape 12 to present the next question after the receipt of a signal indicating a correct answer is connected in circuit with the recorder electronics to control the start and stop of the recording tape. A probe means 16 is adapted to fit on a finger of the student, and is connected electrically to the means for advancing 14 by means of flexible wires 17. Although the probe shown fits onto the end of a student's finger, it is obvious that the probe may also be a hand-held probe without departing from the spirit of the invention.

An answer sheet 18, which may be a book, has a plurality of answers 19 corresponding to each question recorded on tape 12. Each correct answer is associated with an electrical conductive area 20. The incorrect answers may have an associated area which is visually identical to that of the correct answer but which is not electrically conductive. For younger students, the correct answer may be a conductive picture 23 or a conductive letter 21 or number 22.

In any of the above options, the one requirement is that the conductive area not be discernible to the human eye from that of the non-conductive (incorrect answers). The conductive area can be formed from conductive ink or from a foil which is colored similar to the non-conductive areas. One type of foil which may be used to advantage with the invention is manufactured by M. Swift & Sons, Inc., 10 Love Lane, Hartford, Connecticut under their Code No. C-20116. Aluminum or other types of foil could also be used with a clear coat of varnish being applied over the areas to remain non-conductive.

Figure 2:
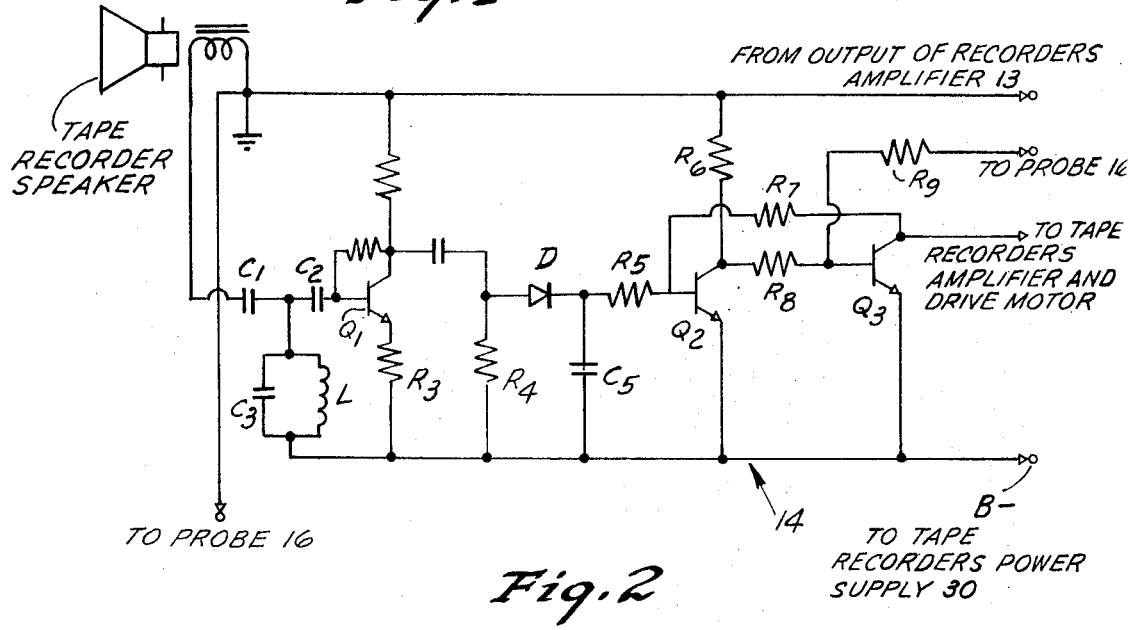
FIG. 2 is an electrical schematic diagram of a circuit which may be used with the embodiment of FIG. 1.
Figure 3:
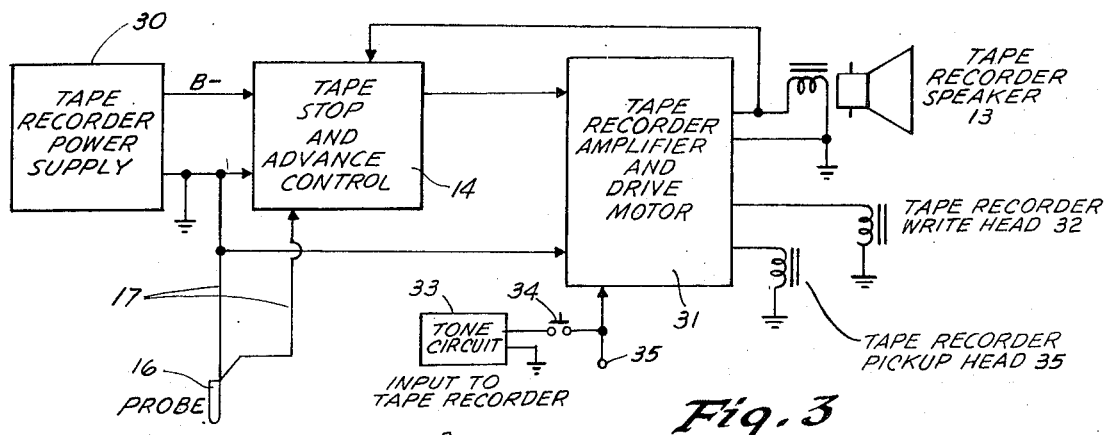
FIG. 3 is an electrical block diagram illustrating the interconnections of the circuit of FIG. 2 into the embodiment of FIG. 1.

Referring now to FIGS. 2 and 3 in which FIG. 2 illustrates the tape stop and advance control circuit 14 and its interconnection in a standard tape recorder. In operation, $Q_2$ and $Q_3$ form a flip-flop circuit. When $Q_3$ is held on (from bias supplied through $R_6$ and $R_8$) tape recorder operating circuit is allowed to flow through the tape recorder in a normal manner. When the tape head receives the tone signal that has been programmed on to the tape at the end of a question, the band-pass filter made up of $L_1$ and $C_3$ allows the tone signal to enter the base of $Q_1$. $Q_1$ is a common emitter amplifier and the amplified base voltage of $Q_1$ is rectified by diode $D_1$ and stored in $C_5$. The charge on $C_5$ builds up until $Q_2$ is biased on, which removes the drive current from $Q_3$, thus turning $Q_3$ off. When $Q_3$ is turned off, drive current is removed from the tape recorder (amplifier and motor), causing it to stop. The recorder can only be made to start and advance to another question by allowing the probe to contact one of the conductive areas. When this occurs, a bias path, made up of the probe and $R_9$, to $Q_3$ is completed. $Q_3$ is held on after removal of the probe from the conductive areas by the bias supplied through $R_6$ and $R_8$. The remaining resistors $R_1$, $R_2$, $R_3$, $R_4$, $R_5$ and $R_7$ determines the operating points of transistors $Q_1$, $Q_2$ and $Q_3$. In one embodiment the following components were used:

$R_1 = 2.7$K ohm
$R_2 = 51$ ohm
$R_3 = 200$ ohm
$R_4 = 5.1$K ohm
$R_5 = 5.1$K ohm
$R_6 = 750$ ohm
$R_7 = 10$K ohm
$R_8 = 2$K ohm
$R_9 = 100$ ohm
$Q_1 = 2$N697
$Q_2 = 2$N697
$Q_3 = 2$N697
$C_1 = 0.2$ uf, 25 VDC
$C_2 = 0.2$ uf, 25 VDC
$C_3 = 0.2$ uf, 25 VDC
$C_4 = 0.2$ uf, 25 VDC
$C_5 = 2$ uf, 25 VDC
$L_1 = 20$ mh
$D_1 = 1$N4001

Figure 4:
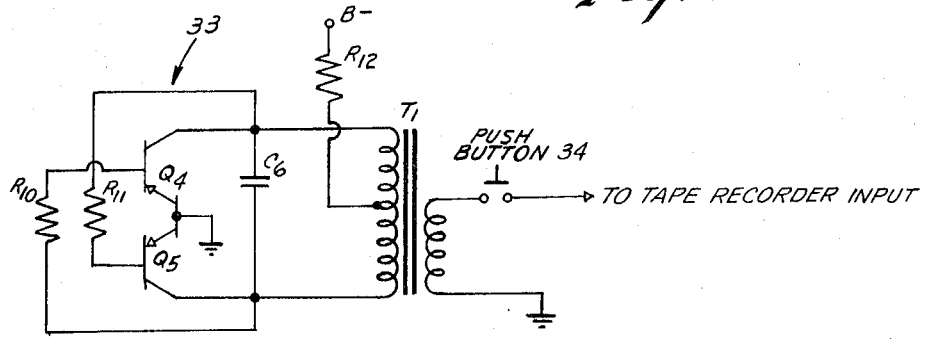
FIG. 4 is a schematic of a circuit which may be used with the embodiment of the invention shown in FIG. 1.

The tape recorder's power supply 30 is connected to the tape recorder's amplifier and drive motor 31 through the tape stop and advance control circuit 14. A tone circuit 33 (shown in FIG. 4) is connected to the tape recorder's input 35 through a push button switch 34. The tone circuit is designed to generate a tone that will be compatible with the band pass filter circuit of the tape stop and advance circuit 14. When a new question tape is being prepared, a question is recorded on the tape by the tape recorder's write head 32. At the end of a question, the instructor presses the tone button 34 to place a tone on the tape. When the tone is picked up by the pickup head 35 and sent to the tape stop and advance control circuit through the recorder's amplifier during the playback of the tape, the tape is stopped.

Transistors $Q_4$ and $Q_5$ form an oscillator. The tank circuit is made up of the reactance of $C_6$ and the inductance of the primary of $T_1$. The desired tone signal is determined by the value of $C_1$ and can be adjusted over a large range. Resistor $R_{12}$ reflects an isolating impedance to the tank circuit so that a low distortion sinusoid results. $Q_4$ and $Q_5$ and resistors $R_{10}$ and $R_{11}$ cross couple the bases of transistors $Q_4$ and $Q_5$ in the common oscillator configuration. The 180° phase required for an oscillator shift is obtained from the center tapped transformer. Closing button 34 allows a stepped-down portion of the OSC voltage to enter the tape input 35.

Figures 5, 6:
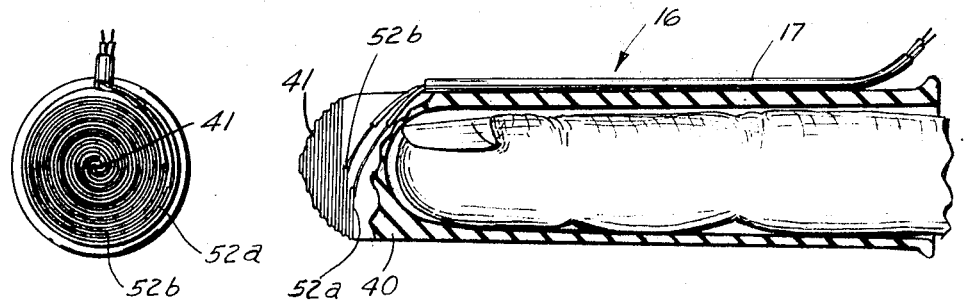
FIG. 5 is a sectioned view of a probe which may be used with the embodiment of FIG. 1.
FIG. 6 is a front view of the probe of FIG. 5.

Referring now to FIGS. 5 and 6 wherein the probe means 16 is shown comprised of an insulating semiflexible hollow cylinder body 40 which is formed to receive a student's finger 5. The end 41 of the probe is rounded to provide a smooth contour which will not damage the answer sheet or injure a student. Two parallel conductors 52a and 52b comprise flexible wire 17. The conductors are insulated from each other with a coating of varnish. The conductors are wound in a spiraling helix path around the tip 41 of the probe and are held in place by cement. The exposed insulating coating is then sandpapered off to expose the conductors while still maintaining the insulation between them. A conductive area bridging any section of two adjacent conductors will provide a signal to the tape stop and advance control circuit 14.

A second probe which may be used is illustrated in FIGS. 7 and 8. The probe means 16 is shown comprised of an insulating body 57 which is formed to receive a student's finger. The end of the probe is formed by sandwiching an insulator sheet 55 between electrical conductor sheets 54 and 56 and rolling them together to form a tight cylinder. Adhesive is used to hold the sheets together. The end of the formed cylinder can then be rounded off and attached to the body 57. Conductor sheet 54 is connected to conductor 52a and conductor sheet 56 is connected to conductor 52b. By spacing the conductors 54 and 56 close together and repeating the patterns of the conductors, the sensitivity in terms of critical alignment and the amount of conductive area which must be touched before the circuit is complete is minimized. This feature is extremely important when young children operate the machine as their ability to align the probe exactly over a restricted contact area is extremely limited. Therefore, the probe has been designed to signal the correct answer when only a small portion of the conductive area comes into contact with the probe tip.

A third embodiment of the probe 16 is shown in FIGS. 9 and 10. In this embodiment slices of conductive material 41 and 43 are separated by slices of insulating material 42. The slices may be held together with any suitable cement, such as contact cement. The conductor 52a is connected to every other conducting slice with conductor 52b connected to the remaining conducting slices. The slices are mounted to the end of the insulating probe body 47.

A fourth embodiment of the probe is illustrated in FIGS. 11 and 12. In this embodiment, a toroid shaped core body 46 has wound thereon two conducting wires 44 and 45 which have a thin insulating cover 47, such as varnish. The wires 44 and 45 are bifilar wound in parallel on the core in close proximity. The insulation on wires 44 and 45 is removed, by sanding for example, in the plane 60. This removes the insulation from the face of the windings but still insulates each coil of the winding from an adjacent coil. Wire 44 is connected at one end to conductor 52a with wire 45 connected to conductor 52b. The toroid body is affixed to the end of the insulating probe body 48. The probe operates in an identical manner to the preceding disclosed probes in that the conductive area, corresponding to a correct answer, connecting any two adjacent coils will signal the tape stop and advance control circuit 14 to advance the tape to the next question.

A fifth embodiment of the probe 16 is shown in FIG. 13. A thin insulating sheet 60 has deposited thereon parallel rows of conductors 61 and 62. Conductor 63 connects conductors 62 together and conductor 64 connects conductors 61 together. Conductor 62 is connected to lead 52a with conductor 64 connected to lead 52b. The insulating sheet 60 is then curved and attached to the insulating probe body 66.

The resolution of each of the aforedescribed probes is determined by the spacing between two alternate conductors and the total area covered by all of the conductors. The resolution of the probes should be small enough to allow a child to position the prob off-center on the conductive area and still complete the advancing circuit.

In summary, a question is asked of the student if the student positions the probe in contact with the conductive area corresponding to the correct answer. The student is told the answer is correct and another question is asked. Wrong answers will not advance the recorder to another question.

I claim:

1. A teaching device comprising in combination:
   A. a recording means having a plurality of questions recorded thereon;
   B. an answer sheet having a plurality of answers thereon with correct answers having conductive areas associated therewith;
   C. recording advancing means connected to said recording means for advancing said recording means to another question upon receipt of an input;
   D. a normally open circuit probe means connected to said recording advancing means to provide an input to said advancing means upon completing the open circuit of said probe means with said conductive area, said probe means being comprised of:
      a. a hollow-cylinder body which is formed to receive a student's finger;
      b. a plurality of conductive areas, each separated by insulating areas;
      c. first conductive means connecting each alternate conductive area; and
      d. second conductive means connecting each other alternate conductive area, said first and second conductive means connected to said recording advancing means to provide said input; and
   E. an indexing means provided on said recording means after each question to stop said recording means until receipt of an input from said probe means.

2. The invention according to claim 1 wherein said plurality of conductive areas comprise:
   A. two interwound spirals of conductive material separated from each other by a spiral of insulating material;
   B. first conductive means connected to one conductive spiral; and
   C. second conductive means connected to the other of said conductive spirals, said first and second conductive means connected to said recording advancing means to provide an input when a conductive area contacts said first and second conductive spiral.

3. The invention according to claim 1 wherein said conductive areas on said answer sheet are formed with conductive inks.

4. The invention according to claim 1 wherein said conductive areas on said answer sheet are formed with conductive foil.

5. A self teaching machine comprising in combination:
   A. means for recording and presenting a sequence of problems one at a time;
   B. means for advancing said recording and presenting means to another problem in the sequence in response to a signal;
   C. means for displaying a plurality of different answers for each problem in the sequence of problems with at least one of said plurality of answers being correct, said correct answers being electrically conductive; and wherein each of said different answers has associated therewith visually identical areas, with the areas associated with correct answers being electrically conductive, said means for displaying being at least one sheet of paper with said plurality of answers printed thereon with ink and with said correct answers being printed with conductive ink; and
   D. probe means having at least two electrically conductive exposed areas associated therewith for providing a signal to said means for advancing when said conductive areas make contact with said correct answer, wherein said probe means is comprised of a plurality of parallel conductors, each insulated from each other, with every other conductor connected to each other, and with the remaining conductors connected to each other so as to provide a signal when any two adjacent conductors are electrically connected together by a conductive correct answer area, and wherein said parallel conductors are wound in the shape of a spiral.

6. A self teaching machine comprising in combination:
   A. means for recording and presenting a sequence of problems one at a time;
   B. means for advancing said recording and presenting means to another problem in the sequence in response to a signal;
   C. means for displaying a plurality of different answers for each problem in the sequence of problems with at least one of said plurality of answers being correct, said correct answers being electrically conductive; and wherein each of said different answers has associated therewith visually identical areas, with the areas associated with correct answers being electrically conductive, said means for displaying being at least one sheet of paper with said plurality of answers printed thereon with ink and with said correct answers being printed with conductive ink; and
   D. probe means having at least two electrically conductive exposed areas associated therewith for providing a signal to said means for advancing when said conductive areas make contact with said correct answer, wherein said probe means is comprised of a plurality of parallel conductors, each insulated from each other, with every other conductor connected to each other, and with the remaining conductors connected to each other so as to provide a signal when any two adjacent conductors are electrically connected together by a conductive correct answer area, and wherein said parallel conductors are wound in the shape of a toroid.

7. A self teaching machine comprising in combination:
   A. means for recording and presenting a sequence of problems one at a time;
   B. means for advancing said recording and presenting means to another problem in the sequence in response to a signal;
   C. means for displaying a plurality of different answers for each problem in the sequence of problems with at least one of said plurality of answers being correct, said correct answers being electrically conductive; and wherein each of said different answers has associated therewith visually identical areas, with the areas associated with correct answers being electrically conductive, said means for displaying being at least one sheet of paper with said plurality of answers printed thereon with ink and with said correct answers being printed with conductive ink; and
   D. probe means having at least two electrically conductive exposed areas associated therewith for providing a signal to said means for advancing when said conductive areas make contact with said correct answer, wherein said probe means is comprised of a plurality of parallel conductors, each insulated from each other, with every other conductor connected to each other, and with the remaining conductors connected to each other so as to provide a signal when any two adjacent conductors are electrically connected together by a conductive correct answer area, and wherein said parallel conductors are wound in the shape of a spiraling helix.

* * * * *